(12) United States Patent
Jian

(10) Patent No.: US 10,642,141 B2
(45) Date of Patent: May 5, 2020

(54) WAVELENGTH-CONVERTING ELEMENT, PROJECTION APPARATUS AND MANUFACTURING METHOD OF WAVELENGTH-CONVERTING ELEMENT

(71) Applicant: Coretronic Corporation, Hsin-Chu (TW)

(72) Inventor: Cheng-Jhih Jian, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/508,326

(22) Filed: Jul. 11, 2019

(65) Prior Publication Data

US 2020/0019048 A1 Jan. 16, 2020

(51) Int. Cl.
| | | |
|---|---|---|
| G03B 21/14 | (2006.01) | |
| C23C 28/02 | (2006.01) | |
| G03B 21/20 | (2006.01) | |
| G02B 5/02 | (2006.01) | |
| G03B 21/00 | (2006.01) | |

(52) U.S. Cl.
CPC .......... *G03B 21/204* (2013.01); *C23C 28/021* (2013.01); *G02B 5/0226* (2013.01); *G02B 5/0284* (2013.01); *G03B 21/008* (2013.01); *G03B 21/2066* (2013.01)

(58) Field of Classification Search
CPC ...... G03B 21/14; G03B 21/204; C23C 28/021
See application file for complete search history.

(56) References Cited

U.S. PATENT DOCUMENTS

| | | | | |
|---|---|---|---|---|
| 9,581,879 | B2 * | 2/2017 | Hsieh | F21V 13/08 |
| 10,473,299 | B2 * | 11/2019 | Yu | F21V 9/40 |
| 10,481,474 | B2 * | 11/2019 | Liao | G03B 33/08 |
| 2017/0146219 | A1 * | 5/2017 | Li | F21V 9/30 |

FOREIGN PATENT DOCUMENTS

| | | |
|---|---|---|
| CN | 104595852 A | 5/2015 |
| TW | 201728388 A | 8/2017 |

\* cited by examiner

*Primary Examiner* — William C. Dowling

(57) ABSTRACT

A wavelength-converting element includes an alloying substrate, a wavelength-converting layer and a diffusion reflection layer. A material of the alloying substrate includes at least five major alloying elements and at least one minor alloying element. The at least five major alloying elements are selected from a group consisting of Ni, Ti, V, Cr, Mn, Fe, Co, Al, Cu, Ta, Nb, Zr, Mg and Pt group elements. An atomic percentage of each of the major alloying elements is between 5 at % and 35 at %. The alloying substrate has mixed entropy, which is greater than 3 J/K·mol. The wavelength-converting layer is disposed above the alloying substrate. The diffusion reflection layer is disposed between the alloying substrate and the wavelength-converting layer. The invention further provides a projection apparatus using the wavelength-converting element and a manufacturing method of the wavelength-converting element. The wavelength-converting element of the invention can improve mechanical properties, temperature resistance and reflectivity.

17 Claims, 3 Drawing Sheets

WAVELENGTH-CONVERTING ELEMENT, PROJECTION APPARATUS AND MANUFACTURING METHOD OF WAVELENGTH-CONVERTING ELEMENT

CROSS-REFERENCE TO RELATED APPLICATION

This application claims the priority benefit of China Application (CN201810767280.7) filed on Jul. 13, 2018. The entirety of the above-mentioned Patent Application is hereby incorporated by reference herein and made a part of this specification

FIELD OF THE INVENTION

The invention relates to a display apparatus, and more particularly to a wavelength-converting element, a projection apparatus using the wavelength-converting element and a manufacturing method of the wavelength-converting element.

BACKGROUND OF THE INVENTION

With the market requirements for brightness, color saturation, service life, non-toxic environmental protection, etc of projection apparatus, the types of light sources used in the projection apparatus have evolved from UHP lamp, light emitting diode (LED) to laser diode (LD).

At present, the cost of high-brightness red laser diodes and green laser diodes is too high. In order to reduce the cost, a blue laser diode is used to excite the phosphor powder on the phosphor wheel to generate yellow light and green light. The desired red light is filtered out of the yellow light by a filter wheel. Together with the blue light emitted by the blue laser diode, the three primary colors of red, green and blue required for the projection image are generated.

Currently, the phosphor wheel is an extremely important optical component of the projection apparatus using a laser diode as a light source. However, conventional aluminum substrates are easily deformed at a high temperature due to their low temperature resistance. Therefore, the wavelength-converting layer and the diffusion reflection layer are required to be cured at a high temperature, and then are demolded and attached onto the aluminum substrate. A plurality of pores is generated in the process, which affects the conversion efficiency and reflectivity of the phosphor wheel.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting element, which can improve mechanical properties, temperature resistance and reflectivity.

The invention provides a manufacturing method of a wavelength-converting element, which can improve mechanical properties, temperature resistance and reflectivity of the wavelength-converting element.

The invention provides a projection apparatus, which can improve the brightness degradation in an image.

Other advantages and objects of the invention may be further illustrated by the technical features broadly embodied and described as follows.

In order to achieve one or a portion of or all of the objects or other objects, a wavelength-converting element provided by an embodiment of the invention includes an alloying substrate, a wavelength-converting layer and a diffusion reflection layer. A material of the alloying substrate includes at least five major alloying elements and at least one minor alloying element. The at least five major alloying elements are selected from a group consisting of Ni, Ti, V, Cr, Mn, Fe, Co, Al, Cu, Ta, Nb, Zr, Mg and Pt group elements. An atomic percentage of each of the major alloying elements is between 5 at % and 35 at %, and a sum of the atomic percentages of the at least five major acting elements is less than 100 at %. An atomic percentage of each of at least one minor alloying element is less than the atomic percentage of each of the major alloying elements. The alloying substrate has mixed entropy, which is greater than 3 J/K·mol. The wavelength-converting layer is disposed above the alloying substrate. The diffusion reflection layer is disposed between the alloying substrate and the wavelength-converting layer.

In order to achieve one or a portion of or all of the objects or other objects, a projection apparatus provided by an embodiment of the invention includes an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam. The illumination system includes an exciting light source and the wavelength-converting element. The wavelength-converting element is disposed on a transmission path of the excitation beam. The wavelength-converting layer of the wavelength-converting element is configured to convert the excitation beam into a converted beam, and the illumination beam includes the converted beam.

In order to achieve one or a portion of or all of the objects or other objects, a manufacturing method of a wavelength-converting element provided by an embodiment of the invention includes: providing an alloying substrate. The alloying substrate includes: at least five major alloying elements and at least one minor alloying element. The at least five major alloying elements are selected from a group consisting of Ni, Ti, V, Cr, Mn, Fe, Co, Al, Cu, Ta, Nb, Zr, Mg and Pt group elements. An atomic percentage of each of major alloying elements is between 5 at % and 35 at %, and the sum of atomic percentages of at least five major alloying elements is less than 100 at %. An atomic percentage of each of at least one minor alloying element is less than the atomic percentage of each of the major alloying elements. The alloying substrate has mixed entropy, which is greater than 3 J/K·mol. A diffusion reflection layer is formed on the alloying substrate. A wavelength-converting layer is formed on the diffusion reflection layer.

In the wavelength-converting element of the embodiments of the invention, the mixed entropy of the alloying substrate is greater than 3 J/K·mol, which belongs to high-entropy alloys substrate. It has higher mechanical strength over a wider temperature range, so as to improve the mechanical strength and temperature resistance of the wavelength-converting element. In addition, the diffusion reflection layer and the wavelength-converting layer can be directly coated on the alloying substrate and performed curing at a high temperature without requirements of demolding and re-bonding process, which can improve contamination of the product or influence of the adhesive to the reflectivity. When the time of curing at a high temperature is elongated, it helps to reduce pores on the diffusion reflection layer and the wavelength-converting layer, which improves the conversion efficiency and reflectivity of wavelength-converting element. The manufacturing method of the wavelength-converting element of the embodiments of the invention can manufacture the above-mentioned wavelength-converting element due to the use of the alloying substrate. The projection apparatus of the embodiments of the invention can improve brightness degradation in an image beam due to the use of the wavelength-converting element.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
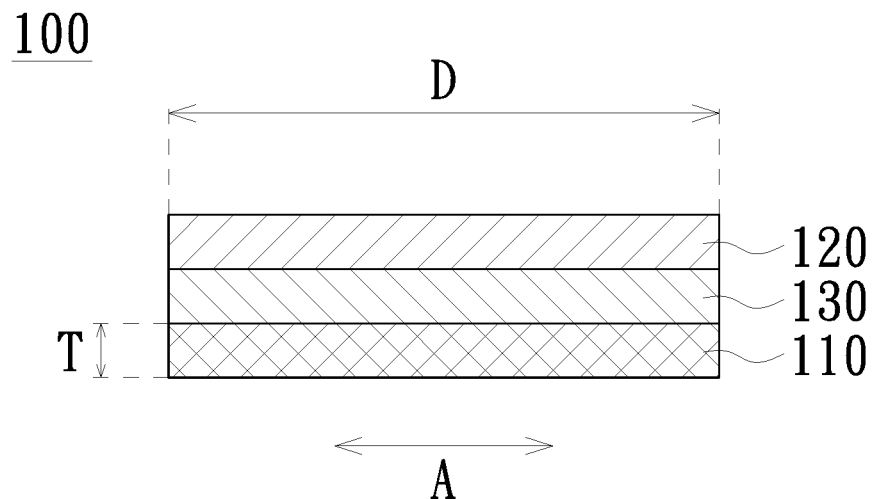
FIG. 1 is a schematic view of a wavelength-converting element according to an embodiment of the invention.

FIG. 1 is a schematic view of a wavelength-converting element according to an embodiment of the invention. Please refer to FIG. 1, the wavelength-converting element 100 of the embodiment includes an alloying substrate 110, a wavelength-converting layer 120 and a diffusion reflection layer 130. The wavelength-converting element 100 is, for example, a sheet component, but is not limited thereto. In other embodiments, the wavelength-converting element 100 may also be a wavelength-converting wheel, and the alloying substrate 110 is, for example, a turntable substrate. A material of the alloying substrate 110 includes at least five major alloying elements and at least one minor alloying element. An atomic percentage of each of the major alloying elements is between 5 at % and 35 at %, and a sum of the atomic percentages of the at least five major alloying elements is less than 100 at %. An atomic percentage of each of the at least one minor alloying element is less than the atomic percentage of each of the major alloying elements. The at least five major alloying elements and the at least one minor alloying element have mixed entropy, which is greater than 3 J/K·mol (about 1.5 R, and R is a gas constant=1.987cal/K·mol), that is the mixed entropy of the alloying substrate 110. The wavelength-converting layer 120 is disposed above the alloying substrate 110. The wavelength-converting layer 120 receives an excitation beam from an exciting light source (a laser diode, a light emitting diode, a laser diode array or a light emitting diode array), and the wavelength-converting layer 120 is excited to emit a color light with a different wavelength range from the excitation beam. The diffusion reflection layer 130 is disposed between the alloying substrate 110 and the wavelength-converting layer 120.

The major alloying elements are selected from a group consisting of Ni, Ti, V, Cr, Mn, Fe, Co, Al, Cu, Ta, Nb, Zr, Mg and Pt group elements. The minor alloying element without a particular limitation is, for example, an alloying element of non-major alloying elements, as long as the mixed entropy of the alloying substrate 110 is greater than 3 J/K·mol.

The alloying substrate 110 is obtained by, for example, the following methods: an atmospheric melting method, a vacuum arc melting method, a vacuum induction melting method, an electric heating wire heating method, an induction heating method, a rapid solidification method, a mechanical alloying ball milling method, a powder metallurgy method, a 3D laser printing method, etc, but is not limited thereto.

The diffusion reflection layer 130 includes an adhesive and a plurality of diffusion reflection particles mixed in the adhesive. The adhesive includes, for example, a silica gel or an inorganic adhesive, but is not limited thereto. A material of the diffusion reflection particles is, for example, white particles, which includes at least one of titanium dioxide, silicon dioxide, aluminum oxide, boron nitride and zirconium dioxide.

The wavelength-converting layer 120 includes, for example, a wavelength-converting material and an adhesive, and the wavelength-converting material is mixed in the adhesive. The wavelength-converting material is, for example, phosphor powder or quantum dot. The adhesive includes, for example, a silica gel or an inorganic adhesive, but is not limited thereto. In another embodiment, the wavelength-converting layer includes, for example, a phosphor in glass (PIG), phosphor in ceramic (PIC), a polycrystalline fluorescent sheet, a single crystal fluorescent sheet or phosphor in silicon (PIS), etc.

Figure 2:
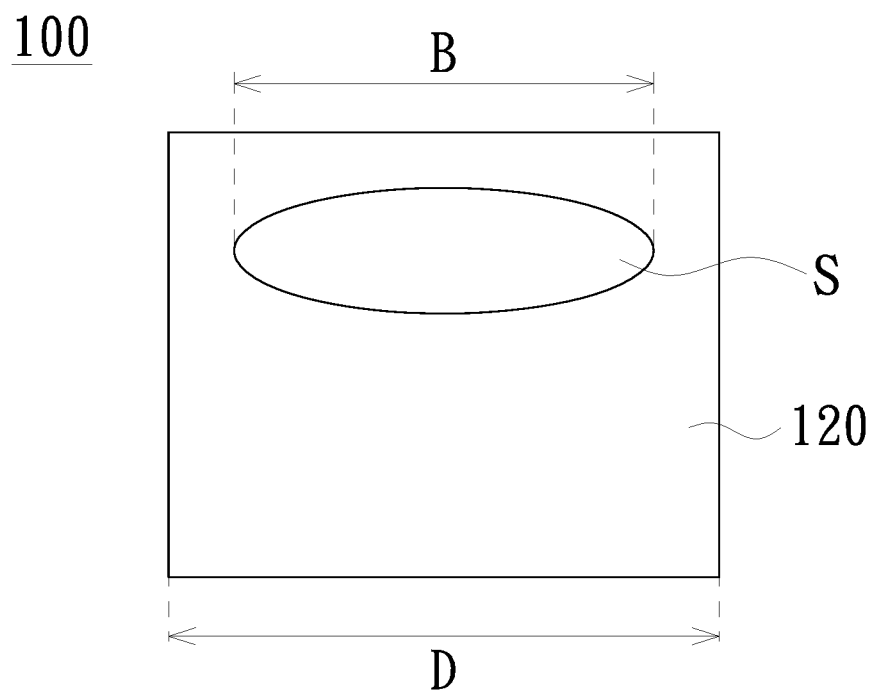
FIG. 2 is a schematic view of a spot formed by an excitation beam on a wavelength-converting element according to an embodiment of the invention.

FIG. 2 is a schematic view of a spot formed by an excitation beam on a wavelength-converting element according to an embodiment of the invention. Please refer to FIG. 1 and FIG. 2, when the wavelength-converting layer 120 and the diffusion reflection layer 130 are disposed on the alloying substrate 110, the width D of the wavelength-converting layer 120 and the diffusion reflection layer 130 in the direction A parallel to the alloying substrate 110 (the widths of two layers are the same in the embodiment, therefore D represents the widths of two layers, but is not limited thereto; that is, the widths of the two layers may be different) is required to be greater than the long axis B of the spot S formed by the excitation beam on the wavelength-converting element 100 (FIG. 2 is illustrated by the uppermost wavelength-converting layer 120), so that the excitation beam can be irradiated on the wavelength-converting element 100 to improve the utilization of a light.

In the wavelength-converting element 100 of the embodiment, the alloying substrate 110 belongs to a high entropy alloying substrate due to its mixed entropy is greater than 3 J/K·mol. The high entropy alloying substrate has higher mechanical strength over a wider temperature range, and therefore, mechanical strength and temperature resistance of the wavelength-converting element 100 can be improved. In addition, the diffusion reflection layer 130 and the wavelength-converting layer 120 can be directly coated on the alloying substrate 110 and performed curing at a high temperature without the requirements of demolding and re-bonding process, thus, the contamination of the produce or influence of the adhesive to the reflectivity can be improved. When the time of curing at a high temperature is elongated, it helps to reduce pores of the diffusion reflection layer 130 and the wavelength-converting layer 120, which improves conversion efficiency and reflectivity of the wavelength-converting element 100.

Regarding the mechanical strength and temperature resistance, specifically, due to the lattice distortion caused by the high entropy effect makes the difference row difficult to move, the alloying substrate 110 of the embodiment generates the solid solution strengthening. Therefore, the alloying substrate 110 of the embodiment has a higher tensile strength than the know aluminum substrate. In addition, the surface hardness of the alloying substrate 110 is greater than the known aluminum substrate. The alloying substrate 110 also has a slower speed of diffusion and phase change due to the high entropy effect and is simpler in the microstructure. Therefore, it is less deformed when subjected to a force at a high temperature and has higher temperature assistance.

A melting point of the alloying substrate 110 of the embodiment is, for example, greater than 900° C.

In order to achieve the above effects, the thickness T of the alloying substrate 110 according to an embodiment of the invention is, for example, from 0.5 to 1 mm.

Figure 3:
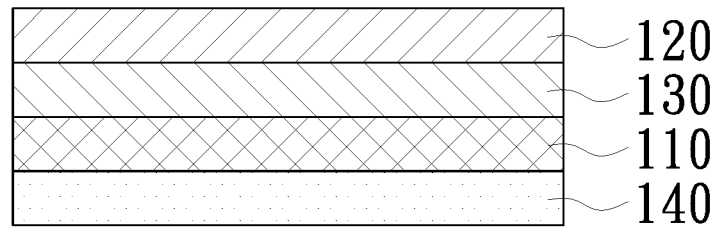
FIG. 3 is a schematic view of a wavelength-converting element according to another embodiment of the invention.

FIG. 3 is a schematic view of a wavelength-converting element according to another embodiment of the invention. Please refer to FIG. 3, the wavelength-converting element 100a of the embodiment is similar to the wavelength-converting element 100 in functions and advantages. The difference is only that the wavelength-converting element 100a of the embodiment further includes a thermally conductive layer 140 disposed on a side of the alloying substrate 110 away from the diffusion reflection layer 130. That is, the alloying substrate 110 is disposed between the diffusion reflection layer 130 and the thermally conductive layer 140. The thermally conductive layer 140 is, for example, in a form of a thermally conductive adhesive or a thermally conductive patch for helping to dissipate heat from the alloying substrate 110. Therefore, a thermal conductivity of the thermally conductive layer 140 is required to be greater than or equal to a thermal conductivity of the alloying substrate 110. In the embodiment, the thermal conductivity of the thermally conductive layer 140 is, for example, from 1 to 300 W/m²·K.

Figure 4:
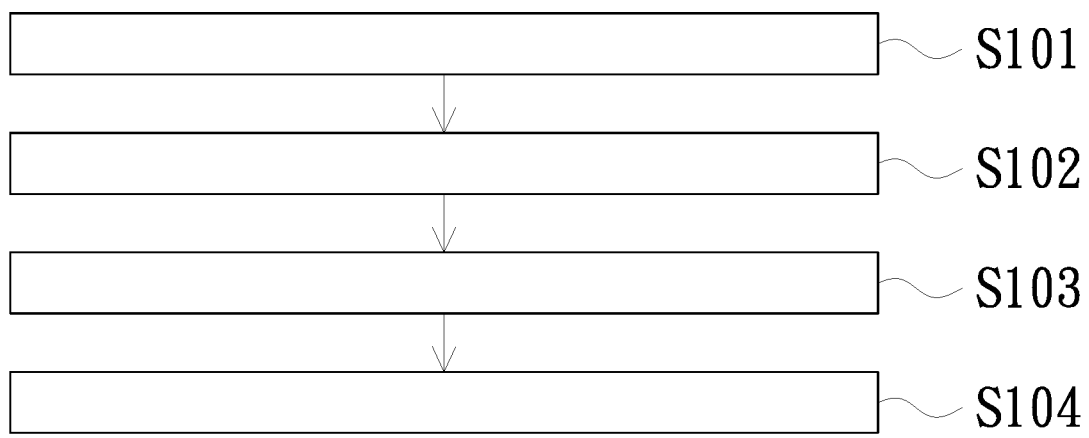
FIG. 4 is a schematic flow chart showing a manufacturing method of a wavelength-converting element according to an embodiment of the invention.

FIG. 4 is a schematic flow chart showing a manufacturing method of a wavelength-converting element according to an embodiment of the invention. Please refer to FIG. 1 and FIG. 4, the manufacturing method of the wavelength-converting element 100 of the embodiment includes the following steps.

The step S101: providing the alloying substrate 110 of the embodiment. The step S102: forming a diffusion reflection layer 130 on the alloying substrate 110. Specifically, for example, an adhesive is mixed with a plurality of diffusion reflection particles and coated on the alloying substrate 110 to form the diffusion reflection layer 130, and then the diffusion reflection layer 130 is cured. For example, the adhesive is an inorganic adhesive, and the curing temperature is from 200° C. to 300° C. That is, the diffusion reflection layer 130 is cured by baking at a temperature from 200° C. to 300° C. In another embodiment, the adhesive is a silica gel, and the curing temperature is at 100° C. That is, baking is performed at a temperature of 100° C., but is not limited thereto.

The step S103: forming a wavelength-converting layer 120 on the diffusion reflection layer 130. The specific method for forming the wavelength-converting layer 120 is, for example, to mix an adhesive with a wavelength-converting material, coat them on the diffusion reflection layer 130 to form the wavelength-converting layer 120, and then cure the wavelength-converting layer 120. The adhesive is, for example, an inorganic adhesive or a silica gel. In an embodiment, the adhesive is an inorganic adhesive, the curing temperature is greater than 300° C., and the wavelength-converting layer 120 is cured for more than 1 hour preferably. In another embodiment, the adhesive is a silica gel, and the curing temperature is greater than 100° C., but is not limited thereto. In an embodiment, it is worth mentioning that the adhesive is an inorganic adhesive, a curing temperature required for the wavelength-converting layer 120 is greater than a curing temperature required for the diffusion reflection layer 130, and a curing-baking time required for the wavelength-converting layer 120 is greater than a curing-baking time required for diffusion reflection layer 130. In another embodiment, the adhesive is a silica gel, a curing temperature required for the wavelength-converting layer 120 is greater than a curing temperature required for the diffusion reflection layer 130, and a curing-baking time required for the wavelength-converting layer 120 is greater than a curing-baking time required for the diffusion reflection layer 130.

In the embodiment of the wavelength-converting element 100a, in order to improve capability of heat dissipation, the manufacturing method of the wavelength-converting element 100a further includes, for example, the step S104: forming the thermally conductive layer 140 on a side of the alloying substrate 110 away from the diffusion reflection layer 130. The thermally conductive layer 140 is formed by, for example, making the thermally conductive adhesive coated on a surface of the alloying substrate 110 or making the thermally conductive patch attached to the alloying substrate 110. The invention does not particularly limit a form of the thermally conductive layer.

Figure 5:
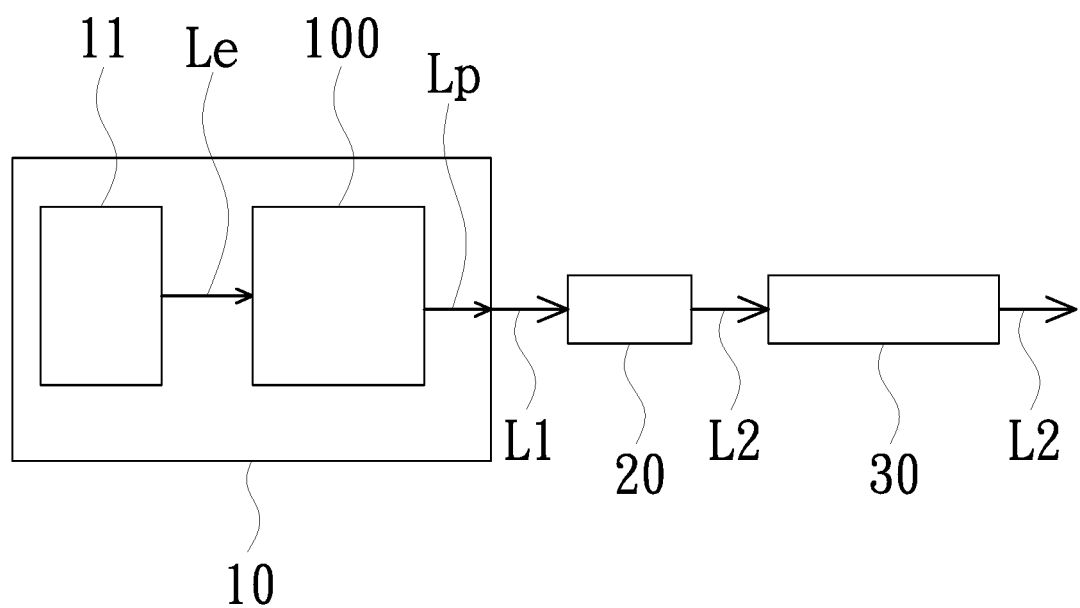
FIG. 5 is a schematic view of a projection apparatus according to an embodiment of the invention.

FIG. 5 is a schematic view of a projection apparatus according to an embodiment of the invention. Please refer to FIG. 5, in the embodiment, the wavelength-converting element 100 is, for example, a wavelength-converting wheel, and the alloying substrate 110 is, for example, a turntable. The projection apparatus 1 of the embodiment includes an illumination system 10, a light valve 20 and a projection lens 30. The illumination system 10 is configured to provide an illumination beam L1. The illumination system 10 includes an exciting light source 11 and the wavelength-converting element 100. The exciting light source is configured to provide an excitation beam Le. The wavelength-converting element 100 is disposed on a transmission path of the excitation beam Le. The wavelength-converting element 100 includes a wavelength-converting layer 120, a diffusion reflection layer 130 and an alloying substrate 110. The wavelength-converting element 100 is configured to convert the excitation beam Le into a converted beam Lp. The illumination beam L1 includes the converted beam Lp and the excitation beam Le. The illumination system 10 further includes other optical components such as a light combining component, a filter wheel, a light homogenization component and a lens, so that the illumination beam L1 is transmitted to the light valve 20. The light valve 20 is disposed on a transmission path of the illumination beam L1 to convert the illumination beam L1 into an image beam L2. The light valve 20 may be a transmissive light valve or a reflective light valve. The transmissive light valve may be a transparent liquid crystal panel, and the reflective light valve may be a digital micro-mirror device (DMD), a liquid crystal on silicon (LCoS) panel. In addition, it may also be an electro-optical modulator, a maganeto-optic modulator and an acousto-optic modulator (AOM), but is not limited thereto. Depending on different design structures, the amount of the light valve may be single or plural. The projection lens 30 is disposed on a transmission path of the image beam L2 and is configured to project the image beam L2 out of the projection apparatus 1. The projection lens 30 includes, for example, a single or a combination of a plurality of optical lenses with diopter, such as including, for example, various combinations of non-planar lens such as a biconcave lens, a biconvex lens, a concave-convex lens, a convexo-concave lens, a plano-convex lens and a plano-concave lens. In an embodiment, the projection lens 30 may also include a plane optical lens to change the projected direction of the image beam L2. The invention does not limit the type and variety of the projection lens 30.

FIG. 5 is exemplified by the wavelength-converting element 100 of FIG. 1, but the wavelength-converting element 100 may be replaced with the wavelength-converting element 100a.

The projection apparatus 1 of the embodiment can achieve effects of temperature resistance improvement and fewer pores (as described above, pores affect conversion efficiency and reflection an effect) by using the wavelength-converting elements 100, 100a, therefore, it can improve the brightness degradation in an image beam L2.

In summary, in the wavelength-converting element of the embodiments of the invention, the mixed entropy of the alloying substrate is greater than 3 J/K~mol belonging to high entropy alloying substrate, which has higher mechanical strength over a wider temperature range which can be warmed. Therefore, it can improve the mechanical strength and temperature resistance of the wavelength-converting element. In addition, the diffusion reflection layer and the wavelength-converting layer can be directly coated on the alloying substrate and performed curing at a high temperature, without requirements of demolding and re-bonding process, which can improve contamination of the product or influence of the adhesive to the reflectivity. When the time of curing at a high temperature is elongated, it helps to reduce pores generated on the diffusion reflection layer and the wavelength-converting layer, which improves conversion efficiency and reflectivity of the wavelength-converting element. The manufacturing method for the wavelength-converting element of the embodiment of the invention can improve mechanical strength and the temperature resistance of the wavelength-converting element manufactured due to the use of the alloying substrate. The projection apparatus of the embodiments of the invention can improve brightness degradation in an image beam due to the use of the wavelength-converting element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength-converting element, comprising an alloying substrate, a wavelength-converting layer and a diffusion reflection layer, wherein a material of the alloying substrate comprises at least five major alloying elements and at least one minor alloying element, wherein the at least five major alloying elements are selected from a group consisting of Ni, Ti, V, Cr, Mn, Fe, Co, Al, Cu, Ta, Nb, Zr, Mg and Pt group elements, an atomic percentage of each of the major alloying elements is between 5 at % and 35 at %, and a sum of the atomic percentages of the at least five major alloying elements is less than 100 at %, and an atomic percentage of each of the at least one minor alloying element is less than the atomic percentage of each of the major alloying elements, and the alloying substrate has mixed entropy, and the mixed entropy is greater than 3 J/K·mol, the wavelength-converting layer is disposed above the alloying substrate, and the diffusion reflection layer is disposed between the alloying substrate and the wavelength-converting layer.

2. The wavelength-converting element according to claim 1, wherein the atomic percentage of each of the at least one minor alloying element is less than 5 at %.

3. The wavelength-converting element according to claim 1, wherein the wavelength-converting layer comprises a phosphor in glass, a phosphor in ceramic, a polycrystalline fluorescent sheet, a single crystal fluorescent sheet or a phosphor in silicon.

4. The wavelength-converting element according to claim 1, wherein the wavelength-converting layer comprises a wavelength-converting material and an adhesive, the wavelength-converting material is mixed in the adhesive, and the adhesive comprises a silica gel or an inorganic adhesive.

5. The wavelength-converting element according to claim 1, wherein the diffusion reflection layer comprises an adhesive and a plurality of diffusion reflection particles mixed in the adhesive, and the adhesive comprises a silica gel or an inorganic adhesive.

6. The wavelength-converting element according to claim 5, wherein a material of the diffusion reflection particles comprises at least one of titanium dioxide, silicon dioxide, aluminum oxide, boron nitride and zirconium dioxide.

7. The wavelength-converting element according to claim 1, further comprising a thermally conductive layer disposed on a sides of the alloying substrate away from the diffusion reflection layer.

8. The wavelength-converting element according to claim 7, wherein a thermal conductivity of the thermally conductive layer is greater than or equal to a thermal conductivity of the alloying substrate.

9. The wavelength-converting element according to claim 1, wherein the wavelength-converting element is a wavelength-converting wheel, and the alloying substrate is a turntable.

10. A projection apparatus, comprising an illumination system, a light valve and a projection lens, wherein the illumination system is configured to provide an illumination beam, the light valve is disposed on a transmission path of the illumination beam to convert the illumination beam into an image beam, the projection lens is disposed on a transmission path of the image beam, and wherein the illumination system comprises an exciting light source and a wavelength-converting element, wherein the exciting light source is configured to provide an excitation beam, and the wavelength-converting element comprises an alloying substrate, a wavelength-converting layer and a diffusion reflection layer, the alloying substrate comprises at least five major alloying elements and at least one minor alloying element, the at least five major alloying elements are selected from a group consisting of Ni, Ti, V, Cr, Mn, Fe, Co, Al, Cu, Ta, Nb, Zr, Mg and Pt group elements, an atomic percentage of each of the major alloying elements is between 5 at % and 35 at %, a sum of the atomic percentages of the at least five major acting elements is less than 100 at %, a atomic percentage of each of at least one minor alloying element is less than the atomic percentage of each of the major alloying elements, the alloying substrate has mixed entropy, and the mixed entropy is greater than 3 J/K·mol, the wavelength-converting layer is disposed above the alloying substrate, and the diffusion reflection layer is disposed between the alloying substrate and the wavelength-converting layer, the wavelength-converting element is disposed on a transmission path of the excitation beam, the wavelength-converting layer of the wavelength-converting element is configured to convert the excitation beam into a converted beam, and the illumination beam comprises the converted beam.

11. A manufacturing method of a wavelength-converting element, comprising:

providing an alloying substrate, wherein the alloying substrate comprises: at least five major alloying elements and at least one minor alloying element, at least five major alloying elements are selected from a group consisting of Ni, Ti, V, Cr, Mn, Fe, Co, Al, Cu, Ta, Nb, Zr, Mg and Pt group elements, an atomic percentage of each of the major alloying elements is between 5 at % and 35 at %, a sum of the atomic percentages of at least five major acting elements is less than 100 at %, an atomic percentage of each of at least one minor alloying element is less than the atomic percentage of each of the major alloying elements, and the alloying substrate has mixed entropy, the mixed entropy is greater than 3 J/K·mol;

forming a diffusion reflection layer on the alloying substrate, and forming a wavelength-converting layer on the diffusion reflection layer.

12. The manufacturing method of the wavelength-converting element according to claim 11, further comprising:

forming a thermally conductive layer on a side of the alloying substrate away from the diffusion reflection layer.

13. The manufacturing method of the wavelength-converting element according to claim 11, wherein a method of forming the diffusion reflection layer on the alloying substrate comprises:

mixing an inorganic adhesive with a plurality of diffusion reflection particles and coating them on the alloying substrate to form the diffusion reflection layer; and curing the diffusion reflection layer by baking at a temperature from 200° C. to 300° C.

14. The manufacturing method of the wavelength-converting element according to claim 11, wherein a method of forming the wavelength-converting layer on the diffusion reflection layer comprises:

mixing an inorganic adhesive with a wavelength-converting material and coating them on the diffusion reflection layer to form the wavelength-converting layer; and curing the wavelength-converting layer by baking at a temperature greater than 300° C.

15. The manufacturing method of the wavelength-converting element according to claim 14, wherein the method of forming the wavelength-converting layer on the diffusion reflection layer further comprises:

curing the wavelength-converting layer for more than 1 hour.

16. The manufacturing method of the wavelength-converting element according to claim 11, wherein a method of forming the diffusion reflection layer on the alloying substrate comprises:

mixing a silica gel with a plurality of diffusion reflection particles and coating them on the alloying substrate to form the diffusion reflection layer; and curing the diffusion reflection layer by baking at a temperature of 100° C. in general.

17. The manufacturing method of the wavelength-converting element according to claim 11, wherein a method of forming the wavelength-converting layer on the diffusion reflection layer comprises:

mixing a silica gel with a wavelength-converting material and coating them on the diffusion reflection layer to form the wavelength-converting layer; and curing the wavelength-converting layer by baking at a temperature greater than 100° C.

\* \* \* \* \*